United States Patent
Liu et al.

(10) Patent No.: US 11,710,142 B2
(45) Date of Patent: Jul. 25, 2023

(54) SYSTEMS AND METHODS FOR PROVIDING INFORMATION FOR ONLINE TO OFFLINE SERVICE

(71) Applicant: BEIJING DIDI INFINITY TECHNOLOGY AND DEVELOPMENT CO., LTD., Beijing (CN)

(72) Inventors: Lei Liu, Beijing (CN); Huan Chen, Beijing (CN); Qi Song, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 265 days.

(21) Appl. No.: 17/078,075

(22) Filed: Oct. 22, 2020

(65) Prior Publication Data

US 2021/0042772 A1 Feb. 11, 2021

Related U.S. Application Data

(63) Continuation of application No. PCT/CN2018/090688, filed on Jun. 11, 2018.

(51) Int. Cl.
 *G06Q 30/0204* (2023.01)
 *G06N 20/00* (2019.01)
 (Continued)

(52) U.S. Cl.
 CPC ... *G06Q 30/0205* (2013.01); *G06F 16/24575* (2019.01); *G06F 16/24578* (2019.01);
 (Continued)

(58) Field of Classification Search
 CPC ........ G06Q 10/00; G06Q 10/06; G06Q 30/02; G06Q 50/10; G06Q 50/30;
 (Continued)

(56) References Cited

U.S. PATENT DOCUMENTS 10,349,223 B1* 7/2019 Yoo .................. G06Q 50/30
2009/0276414 A1 11/2009 Gao et al.
(Continued)

FOREIGN PATENT DOCUMENTS

CN 101106793 A 1/2008
CN 108023924 A 5/2013
(Continued)

OTHER PUBLICATIONS

Campana et al., A Machine-Learned Ranking Algorithm for Dynamic and Personalised Car Pooling Services, Nov. 1, 2016, 2016 IEEE 19th International Conference on Intelligent Transportation Systems, pp. 1856-1862 (Year: 2016).*

(Continued)

*Primary Examiner* — Robert D Rines
(74) *Attorney, Agent, or Firm* — Metis IP LLC

(57) ABSTRACT

The present disclosure relates to a system, method and non-transitory computer readable medium. The system includes at least one computer-readable storage medium including a set of instructions and at least one processor in communication with the at least one computer-readable storage medium. When executing the set of instructions, the at least one processor is directed to: receive a triggering event in the absence of input from a user terminal associated with a user; obtain one or more candidate destinations based on the triggering event; obtain a trained ranking model; determine a ranking result of the one or more candidate destinations based on the trained ranking model; and transmit the ranking result to the user terminal in response to the triggering event.

18 Claims, 7 Drawing Sheets

(51) Int. Cl.
  *G06F 16/2457* (2019.01)
  *G06Q 10/10* (2023.01)
  *G06Q 50/30* (2012.01)

(52) U.S. Cl.
  CPC .............. *G06N 20/00* (2019.01); *G06Q 10/10* (2013.01); *G06Q 50/30* (2013.01)

(58) Field of Classification Search
  CPC ........ G06F 16/24578; G06F 16/24575; G06N 5/04; G06N 20/00; H04W 4/40; H04W 4/42; H04W 4/029
  See application file for complete search history.

(56) References Cited

U.S. PATENT DOCUMENTS

| | | |
|---|---|---|
| 2011/0208735 A1 | 8/2011 | Gao et al. |
| 2014/0025296 A1 | 1/2014 | Shimizu et al. |
| 2015/0073693 A1 | 3/2015 | Yang et al. |
| 2017/0256012 A1* | 9/2017 | Buzalja ................ G06Q 50/188 |
| 2018/0095977 A1* | 4/2018 | Reddy ............... G06F 16/24575 |
| 2018/0188049 A1 | 7/2018 | Shi et al. |
| 2021/0248540 A1* | 8/2021 | Tanabe ..................... G08G 1/00 |

FOREIGN PATENT DOCUMENTS

| | | |
|---|---|---|
| CN | 103674042 A | 3/2014 |
| CN | 105677804 A | 6/2016 |
| CN | 106197460 A | 12/2016 |
| CN | 106289289 A | 1/2017 |
| CN | 106446157 A | 2/2017 |
| CN | 107167136 A | 9/2017 |
| CN | 107967358 A | 4/2018 |
| WO | 2017202112 A1 | 11/2017 |

OTHER PUBLICATIONS

International Search Report in PCT/CN2018/090688 dated Jan. 30, 2019, 5 pages.

Written Opinion in PCT/CN2018/090688 dated Jan. 30, 2019, 4 pages.

* cited by examiner ial Appli# SYSTEMS AND METHODS FOR PROVIDING INFORMATION FOR ONLINE TO OFFLINE SERVICE

CROSS-REFERENCE TO RELATED APPLICATIONS

This application is a continuation of International Application No. PCT/CN2018/090688, filed on Jun. 11, 2018, the entire contents of which are hereby incorporated by reference.

TECHNICAL FIELD

The present disclosure generally relates to a system and method for providing information for an online to offline service, and in particular, to a system and method for providing a plurality of ranked destinations in the absence of input for an online to offline service request.

BACKGROUND

Online to offline services are becoming more and more popular. A user of the online to offline services may input a destination to initial a service order, for example, ordering a meal at a restaurant, taking a taxi to a place. In order to improve user experience, it may be desirable to generate a plurality of candidate destinations in the absence of the user input.

SUMMARY

According to an aspect of the present disclosure, a system may include at least one storage device including a set of instructions; and at least one processor in communication with the at least one storage device. When executing the set of instructions, the at least one processor is configured to cause the system to receive a triggering event in the absence of input from a user terminal associated with a user; obtain one or more candidate destinations based on the triggering event; obtain a trained ranking model; determine a ranking result of the one or more candidate destinations based on the trained ranking model; and transmit the ranking result to the user terminal in response to the triggering event.

In some embodiments, to obtain the one or more candidate destinations, the at least one processor may be further configured to cause the system to obtain a current location of the user terminal; obtain one or more historical records associated with the user, the one or more historical records including at least a historical order or a historical query; and obtain the one or more candidate destinations based on the one or more historical records and the current location of the user terminal.

In some embodiments, the trained ranking model may be generated based on a training process. The training process may include obtaining a plurality of primary historical records, the primary historical record including a primary historical order or a primary historical query; for each of the plurality of primary historical records, determining a plurality of secondary historical records, and determining a primary destination group corresponding to the each of the primary historical records; obtaining a preliminary ranking model; determining, based on the preliminary ranking model, a plurality of sample ranking results for the primary destination groups corresponding to the plurality of primary historical records; obtaining a plurality of primary actual destinations corresponding to the plurality of primary historical records; determining whether the plurality of sample ranking results satisfy a condition based on the plurality of primary actual destinations; and designating, based on a result of the determination that the plurality of ranking results satisfy the condition, the preliminary ranking model as the trained ranking model. The secondary historical record may include a secondary historical order or a secondary historical query. The primary destination group may include a plurality of primary candidate destinations based on the plurality of secondary historical records.

In some embodiments, determining the plurality of sample ranking results may include, for each of the plurality of primary candidate destinations of the primary destination group corresponding to the each of the plurality of primary historical records, extracting one or more features associated with the each of the plurality of primary candidate destinations; assigning one or more preliminary weighting coefficients to the extracted one or more features; and determining, based on the one or more features and the one or more preliminary weighting coefficients, a preliminary weighted value corresponding to the each of the plurality of the primary candidate destinations; and determining, based on the determined preliminary weighted values corresponding to the plurality of primary candidate destinations, a sample ranking result for the each of the primary historical records.

In some embodiments, the training process may further include updating, based on a result of the determination that the plurality of sample ranking results fail to satisfy the condition, the one or more preliminary weighting coefficients of the preliminary ranking model.

In some embodiments, each of the plurality of primary historical records may correspond to a primary start time point or a primary start location. The primary start time point may include a time point when the primary historical order is sent or a time point when the primary historical query is executed. The primary start location may include a location where the primary historical order is sent or a location where the primary historical query is executed. Each of the plurality of secondary historical records may correspond to a secondary start time point. The secondary start time point may include a time point when the secondary historical order is sent or a time point when the secondary historical query is executed. The one or more features associated with the each of the plurality of primary candidate destinations of the each of the plurality of the primary historical records include at least one of a distance between the primary start location of the each of the plurality of the primary historical records and the primary candidate destination of the each of the plurality of the primary historical records; a time interval between the primary start time point of the each of the plurality of the primary historical records and the secondary start time point corresponding to the primary candidate destination of the each of the plurality of the primary historical records; or an occurrence frequency of the primary candidate destination of the each of the plurality of the primary historical records in the plurality of secondary historical records in a time period.

In some embodiments, the preliminary ranking model may include a Lambdarank model.

According to an aspect of the present disclosure, a method implemented on a computing device having at least one processor, at least one computer-readable storage medium, and a communication platform connected to a network may include: receiving a triggering event in the absence of input from a user terminal associated with a user; obtaining one or more candidate destinations based on the triggering event; obtaining a trained ranking model; determining a ranking result of the one or more candidate destinations based on the trained ranking model; and transmitting the ranking result to the user terminal in response to the triggering event.

According to an aspect of the present disclosure, a non-transitory computer readable medium may include instructions configured to cause a computing system to: receive a triggering event in the absence of input from a user terminal associated with a user; obtain one or more candidate destinations based on the triggering event; obtain a trained ranking model; determine a ranking result of the one or more candidate destinations based on the trained ranking model; and transmit the ranking result to the user terminal in response to the triggering event.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
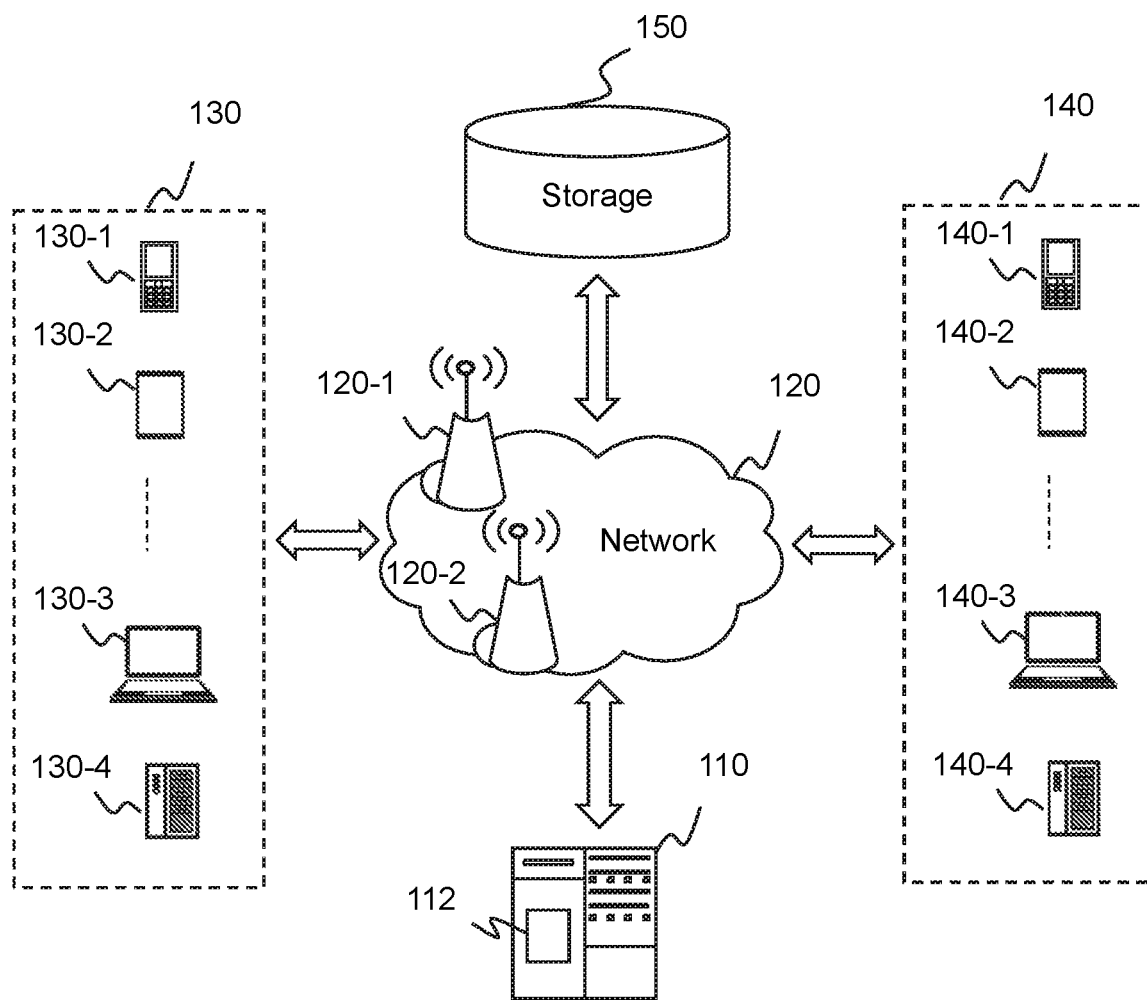
FIG. 1 illustrates an exemplary online to offline service of providing an online to offline service, according to some embodiments.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The terms "passenger," "requestor," "service requestor," and "user" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The terms "service request," "request for a service," "requests," "order," and "service order" in the present disclosure are used interchangeably to refer to a request that may be initiated by a passenger, a service requestor, a user, a driver, a provider, a service provider, or the like, or any combination thereof. The service request may be accepted by any one of a passenger, a service requestor, a user, a driver, a provider, or a service provider. The service request may be chargeable or free.

The term "service provider terminal" in the present disclosure is used to refer to a mobile terminal that is used by a service provider to provide a service or facilitate the providing of the service. The term "user terminal" in the present disclosure is used to refer to a mobile terminal that is used by a service requestor to request or order a service.

It will be understood that, while the system and method in the present disclosure are described primarily in regard to determining a ranking of one or more candidate destinations of a transportation service, it should also be understood that the present disclosure is not intended to be limiting. The system or method of the present disclosure may be applied to any other kind of service. For example, the system or method of the present disclosure may be applied to search engines, digital map applications, navigation systems, etc. The search engines, digital map applications, or navigation systems may use the system and the method provided herein to rank the search results, locations, or destinations, etc. As another example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

Moreover, a system and method for providing at least one ranked candidate destination in the absence of a user input are provided. To be specific, the system may receive a triggering event in the absence of input from a user. Then, the system may determine one or more candidate destinations based on the triggering event. Further, the system may determine a ranking result of the one or more candidate destinations based on a trained ranking model, and transmit the ranking result to the user. Thus, the efficiency of the transportation service is enhanced, and the user experience is also improved.

It should be noted that online to offline transportation service, such as online to offline taxi-hailing service, is a new form of service rooted only in post-Internet era. It provides technical solutions to users and service providers that could raise only in post-Internet era. In pre-Internet era, a user may receive a special offer such as a discount related to a service from newspapers, television advertisements, telephone calls, or leaflets. It is difficult to inform users of the special offer related to the service in time. In addition, the coverage area of users of the traditional methods of special offer recommendation in pre-Internet era is limited. Online to offline service system, however, recommends special offers to larger numbers of users via Internet and ensure that users will not miss the special offers. Therefore, through Internet, the online to offline service systems may provide a much more efficient and accurate recommendation platform for users that may never met in pre-Internet era.

FIG. 1 illustrates an exemplary network environment of providing an online to offline service according to some embodiments. An online to offline service system 100 may be an online to offline transportation service platform implemented in a network environment for providing transportation services. The online to offline service system 100 may include a server 110, a network 120, a user terminal 130, a service provider terminal 140, and a storage 150.

The online to offline service system 100 may provide a plurality of services. Exemplary online to offline service may include a taxi hailing service, a chauffeur service, an express car service, a carpool service, a bus service, a driver hire service, and a shuttle service. In some embodiments, an online to offline service may be provided with supplementary information recommended to perform the online to offline service. The order types may include a taxi order, a luxury car order, an express car order, a bus order, a shuttle order, etc. In some embodiments, the service may be any on-line service, such as booking a meal, shopping, or the like, or a combination thereof.

The server 110 may be a computer server. The server 110 may communicate with the user terminal 130 and/or the service provider terminal 140 to provide various functions of an online to offline service. In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the user terminal 130, the service provider terminal 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to performing one or more functions described in the present disclosure. For example, the processing engine 112 may determine one or more candidate destinations associated with a user. As another example, the processing engine 112 may train a ranking model for the one or more candidate destinations. As still another example, the processing engine 112 may determine a ranking result of the one or more candidate destinations based on the ranking model. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online to offline service system 100 (e.g., the server 110, the user terminal 130, the service provider terminal 140, the storage 150) may send information and/or data to another component (s) in the online to offline service system 100 via the network 120. For example, the server 110 may access and/or obtain a plurality of historical records from the storage 150 via the network 120. The historical records may include historical orders and/or historical queries. As another example, the server 110 may transmit a ranking result of the one or more candidate destinations to the user terminal 130. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

The user terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, an onboard built-in television, a built-in tablet, etc. In some embodiments, the user terminal 130 may include a signal transmitter and a signal receiver configured to communicate with a positioning system for locating the position of the passenger and/or the user terminal 130. In some embodiments, the positioning system may be a global positioning system (GPS), a global navigation satellite system (GLONASS), a compass navigation system (COMPASS), a BeiDou navigation satellite system, a Galileo positioning system, a quasi-zenith satellite system (QZSS), etc.

In some embodiments, the user terminal 130 may be owned by a passenger. In some embodiments, the user terminal 130 may be owned by someone other than the passenger. For example, an owner A of the user terminal 130 may use the user terminal 130 to send a service request for a passenger B, and/or receive a service confirmation and/or information or instructions from the server 110. It should be understood that, in some embodiments, "passenger" and "user terminal" may be used interchangeably, and "driver" and "service provider terminal" may be used interchangeably.

In some embodiments, the service provider terminal 140 may include a plurality of service provider terminals 140-1, 140-2, . . . , 140-n. In some embodiments, the service provider terminal 140 may be similar to, or the same device as the user terminal 130. In some embodiments, the service provider terminal 140 may be customized to implement the online to offline transportation service. In some embodiments, the service provider terminal 140 and the user terminal 130 may be configured with a signal transmitter and a signal receiver to receive position information of the service provider terminal 140 and the user terminal 130 from a positioning system.

In some embodiments, the service provider terminal 140 may be used by a driver. In some embodiments, the service provider terminal 140 may be used by someone other than the driver. For example, a user C of the service provider terminal 140 may use the service provider terminal 140 to receive a service request for a driver D, and/or information or instructions from the server 110. In some embodiments, a driver may be assigned to use one of the service provider terminal 140 for at least a certain period of time, for example, a day, a week, a month, or a year, etc. In some other embodiments, a driver may be assigned to use one of the service provider terminal 140 on a random basis. For example, when a driver is available to provide an online to offline service, he/she may be assigned to use a driver terminal that receives the earliest request and a vehicle that is recommended to perform the type of online to offline service. In some embodiments, the service provider terminal 140 may be associated with one or more drivers (e.g., a night-shift driver, a day-shift driver, or a driver pool by a random shifting).

The storage 150 may store data and/or instructions. The data may include data related to a plurality of historical orders, data related to a plurality of destinations, data related to a plurality of users, data related to a plurality of drivers, data related to the external environment, etc. The data related to the historical orders may include historical start locations, historical start time points, historical destinations, etc. The data related to the plurality of destinations may include names of the destinations, descriptions of the destinations, locations of the destinations, comments of the destinations, etc. The data related to the users may include user profiles. The data related to the drivers may include driver profiles. The data related to the external environment may include weather conditions, road conditions, etc. In some embodiments, the storage 150 may store data obtained from the user terminal 130 and/or the service provider terminal 140. For example, the storage 150 may store log information associated with the user terminal 130. In some embodiments, the storage 150 may store data and/or instructions that the server 110 may execute to provide the online to offline services described in the present disclosure. In some embodiments, storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the online to offline service system 100 may access the data or instructions stored in the storage 150 via the network 120. In some embodiments, the storage 150 may be directly connected to the server 110 as a backend storage.

In some embodiments, one or more components in the online to offline service system 100 (e.g., the server 110, the user terminal 130, the service provider terminal 140) may have permissions to access the storage 150. In some embodiments, one or more components in the online to offline service system 100 may read and/or modify the information related to the passenger, the driver, and/or the vehicle when one or more conditions are met. For example, the server 110 may read and/or modify one or more passengers' user profile after an online to offline service order is completed.

In some embodiments, information exchanging between one or more components of the online to offline service system 100 may be initiated by a triggering event, for example, by way of launching the mobile application of the online to offline services on the user terminal 130, requesting a service order, initiating a query, or other operation of the mobile application on the user terminal (e.g., clicking an input box). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the online to offline service system 100 performs, the element may perform through electrical signals and/or electromagnetic signals. For example, when a user terminal 130 processes a task, such as making a determination, ranking a plurality of candidate destinations, the user terminal 130 may operate logic circuits in its processor to process such task. When the user terminal 130 sends out a triggering event to the server 110, a processor of the user terminal 130 may generate electrical signals encoding the triggering event. The processor of the user terminal 130 may then send the electrical signals to an output port. If the user terminal 130 communicates with the server 110 via a wired network, the output port may be physically connected to a cable, which may further transmit the electrical signal to an input port of the server 110. If the user terminal 130 communicates with the server 110 via a wireless network, the output port of the user terminal 130 may be one or more antennas, which convert the electrical signals to electromagnetic signals. Similarly, a service provider terminal 140 may process a task through operation of logic circuits in its processor, and receive an instruction and/or service order from the server 110 via electrical signals or electromagnet signals. Within an electronic device, such as the user terminal 130, the service provider terminal 140, and/or the server 110, when a processor thereof processes an instruction, sends out an instruction, and/or performs an action, the instruction and/or action is conducted via electrical signals. For example, when the processor retrieves a plurality of historical records associated with a user from a storage medium (e.g., the storage 150), it may send out electrical signals to a reading device of the storage medium, which may read structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
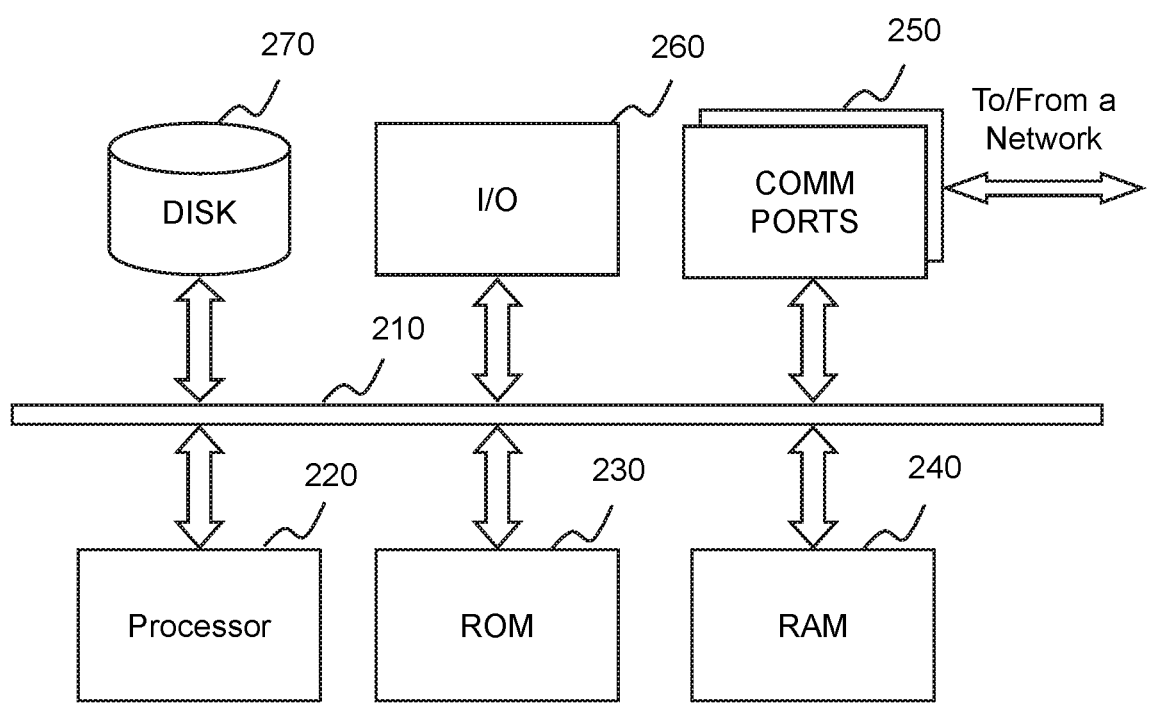
FIG. 2 illustrates an exemplary computing device on which the online to offline service system can be implemented, according to some embodiments of the present disclosure.

FIG. 2 illustrates an exemplary computing device 200 on which the online to offline service system 100 can be implemented, according to some embodiments of the present disclosure.

The computing device 200 may be a general purpose computer or a special purpose computer. Both may be used to implement an on-demand system of the present disclosure. The computing device 200 may be used to implement any component of the service as described herein. For example, the processing engine 112 of the server may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read-only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O component 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
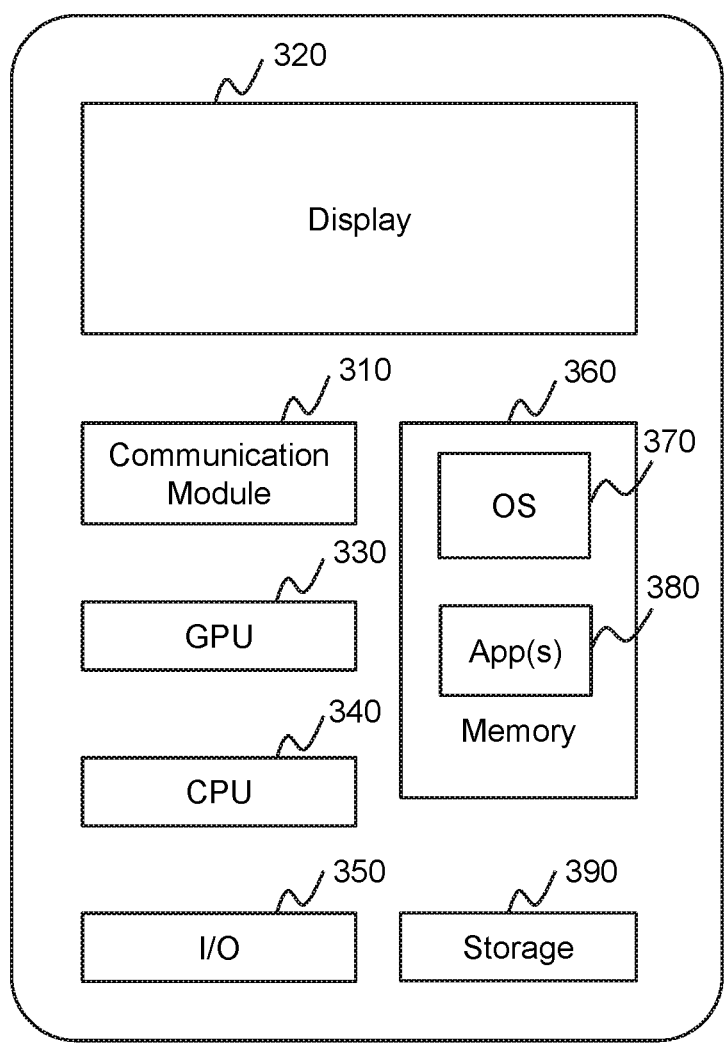
FIG. 3 illustrates an exemplary mobile device on which the online to offline service can be implemented, according to some embodiments of the present disclosure.

FIG. 3 illustrates an exemplary mobile device on which the online to offline service can be implemented, according to some embodiments of the present disclosure.

As illustrated in FIG. 3, the mobile device 300 may include a communication module 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for transmitting, receiving and presenting information relating to a service order (e.g., a plurality of candidate destinations associated with a user) from the processing engine 112 and/or the storage 150. User interactions with the information stream may be achieved via the I/O 350 and provided to the processing engine 112 and/or other components of the online to offline service system 100 via the network 120.

Figure 4:
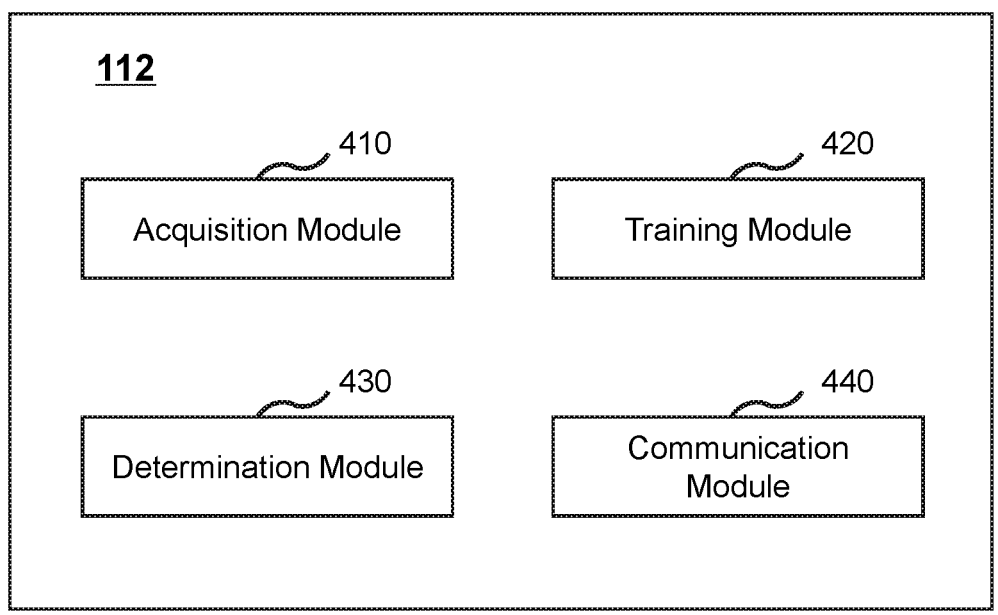
FIG. 4 illustrates an exemplary processing engine, according to some embodiments of the present disclosure.

FIG. 4 illustrates an exemplary processing engine 112 according to some embodiments of the present disclosure. The processing engine 112 of the server 110 may include an acquisition module 410, a training module 420, a determination module 430, and a communication module 440. One or more modules in the processing engine 112 may be implemented by at least one processor, such as the processor 220.

The acquisition module 410 may obtain a triggering event associated with the user terminal 130. The triggering event may correspond to a current time point and a current location. The current time point refers to a time point when the triggering event occurs by the user via the user terminal 130. The current location refers to a location where the triggering event occurs, e.g., the current location of the user terminal 130. In some embodiments, the triggering event may occur in the absence of input. The input may include any input by the user via the user terminal 130, for example, a character string, an image, audio. In some embodiments, the triggering event may include a user login of a mobile application of the on-demand devices on the user terminal 130, the open or initiation of the mobile application on the user terminal 130, a click by the user on the interface (e.g., an input box, a map) of the mobile application, or other suitable operation on the mobile application.

The acquisition module 410 may obtain one or more historical records. The one or more historical records may include at least a historical order or a historical query (e.g., the latest historical query from the current time point). As used herein, an order (a current order or historical order) refers to a service order initiated by a user, which may be transmitted to and/or accepted by the server 120 and/or a driver to perform the service associated with the service order. A query (a current query or historical query) refers to a service query initiated by a user to request information regarding a service (e.g., fees, estimated waiting time, estimated time of arrival), which may become an order if the user takes further action via his or her user terminal 130 (e.g., placing an order based on the query). The historical order may be sent by the user, and the historical query may be executed by the user. In some embodiments, the acquisition module 410 may obtain the one or more records based on a user of the user terminal 130. For example, the acquisition module 410 may obtain the one or more historical records initialized (e.g., sent, executed) by a specified user of the user terminal 130. In some embodiments, the acquisition module 410 may obtain the one or more historical records based on the triggering event. More particularly, the acquisition module 410 may obtain the one or more historical records based on the current time point of the triggering event, the current location of the triggering event, or a combination thereof. For example, the acquisition module 410 may obtain the one or more historical records occurring within a predetermined time range from the current time point of the triggering event. The predetermined time range may include one week, one month, two months, three months, or other time periods. Alternatively or additionally, the acquisition module 410 may obtain the one or more historical records whose destinations exceed a predetermined geographical range from the current location of the triggering event. The predetermined geographical range may include 100 meters, 500 meters, 1000 meters, or other geographical ranges. Alternatively or additionally, the acquisition module 410 may obtain the one or more historical records occurring within a predetermined time range (e.g., 30 days) from the current time point of the triggering event and having a destination exceeding a predetermined geographical range (e.g., 1000 meters) from the current location of the triggering event.

For an obtained triggering event, the acquisition module 410 may also obtain one or more candidate destinations. A candidate destination refers to a destination in which the user of an online to offline service is probably interested at the current time point of the triggering event. In some embodiments, the acquisition module 410 may obtain the one or more candidate destinations based on one or more obtained historical records. For example, the acquisition module 410 may extract an actual destination of an obtained historical record as a candidate destination.

The training module 420 may obtain a trained ranking model. The trained ranking model may rank the one or more obtained candidate destinations. The trained ranking model may include a learning-to-rank (LTR) model, for example, a Lambdarank model. In some embodiments, the trained ranking model may be determined by training a preliminary ranking model using a vast of training data (e.g., a plurality of historical records).

In some embodiments, the training module 420 may obtain a plurality of historical records. For illustration, the plurality of historical records used herein may be referred to as a plurality of primary historical records. A primary historical record may include a primary historical order, a primary historical query, or a combination thereof. In some embodiments, the primary historical record may include a primary start time point, a primary start location, a primary actual destination, etc. For a primary historical order, the primary start time point refers to a time point when the primary historical order is sent by the user via the user terminal 130 to the server 110 and/or the service provider 140. The primary start location refers to a location where the primary historical order is sent by the user via the user terminal 130 to the server 110 and/or the service provider 140 (e.g., the pickup location of the primary historical order). The primary actual destination refers to the destination of the primary historical order. For a primary historical query, the primary start time point refers to a time point when the primary historical query is executed (e.g., when the user requests information relating to a potential service order). The primary start location refers to a location where the primary historical query is executed. The primary actual destination refers to a destination that a user inputted to execute the primary historical query or a destination that the user selected from a plurality of candidate destinations. In some embodiments, the primary historical record may include a primary destination group. The primary destination group may include a plurality of primary candidate destinations. The plurality of primary candidate destinations may include the destinations that had appeared on the list of the candidate destinations shown in the user interface of the user terminal 130 when the user initiated the primary historical record. A primary candidate destination refers to a destination in which the user of an online to offline service was probably interested at the primary start time point.

In some embodiments, for each of the plurality of primary historical record, the training module 420 may determine a plurality of secondary historical records. As used in the present application, the secondary historical records of a primary historical record refer to historical records that occurred before the primary historical record. Similar to a primary historical record, a secondary historical record may include a primary historical order, a primary historical query, or a combination thereof. The secondary historical record may include a secondary start time point, a secondary start location, a secondary actual destination, etc. For a secondary historical order, the secondary start time point refers to a time point when the secondary historical order is sent by the user via the user terminal 130 to the server 110 and/or the service provider 140. The secondary start location refers to a location where the secondary historical order is sent or the service is initiated (e.g., the pickup location) by the user via the user terminal 130 to the server 110 and/or the service provider 140. The secondary actual destination refers to the destination of the historical order. For a secondary historical query, the secondary start time point refers to a time point when the secondary historical query is executed. The secondary start location refers to a location where the secondary historical query is executed. The secondary actual destination refers to a destination that a user inputted to execute the secondary historical query or a destination that the user selected from a plurality of candidate destinations. The acquisition module 410 may obtain the secondary historical records of a primary historical record based on the primary start time point of the primary historical record, the primary start location of the primary historical record, or a combination thereof. For example, the acquisition module 410 may obtain the secondary historical records occurring within a predetermined time range from the primary start time point of the primary historical record. The predetermined time range may include one week, one month, two months, three months, or other time periods. Alternatively or additionally, the acquisition module 410 may obtain the secondary historical records whose secondary actual destinations exceed a predetermined geographical range from the primary start location of the primary historical record. The predetermined geographical range may include 100 meters, 500 meters, 1000 meters, or other geographical ranges. Alternatively or additionally, the acquisition module 410 may obtain the secondary historical records occurring within a predetermined time range (e.g., 30 days) from primary start time point of the primary historical record and having a secondary actual destination exceeding a predetermined geographical range (e.g., 1000 meters) from the primary start location of the primary historical record.

In some embodiments, the training module 420 may determine a plurality of primary candidate destinations based on the plurality of secondary historical records. For example, the training module 420 may extract a secondary actual destination of a secondary historical record as a primary candidate destination.

In some embodiments, the training module 420 may train the preliminary ranking model using the plurality of primary historical records and the plurality of secondary historical records corresponding to each of the plurality of primary historical records. Details regarding the trained ranking model may be found elsewhere in the present disclosure. See, e.g., FIG. 6, and the description thereof.

The determination module 430 may determine a ranking result of the one or more candidate destinations. In some embodiments, for each of the one or more candidate destinations, the determination module 430 may extract one or more features, and determine a weighted value corresponding to the candidate destination based on the one or more features and the trained ranking model. Details regarding the ranking result of the one or more candidate destinations may be found elsewhere in the present disclosure. See, e.g., FIG. 5, and the description thereof.

The communication module 440 may transmit the ranking result of the one or more candidate destinations to the user terminal 130 in response to the triggering event. In some embodiments, the communication module 440 may transmit all or part of the one or more ranked candidate destinations. For example, the communication module 440 may transmit the top six candidate destinations out of ten candidate destinations in the ranking to the user terminal 130.

The acquisition module 410, the training module 420, the determination module 430, and the communication module 440 in the processing engine 112 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the acquisition module 410, the training module 420, the determination module 430, and the communication module 440 may be combined as a single module. For example, the training module 420 may be integrated with the determination module 430 as a single module. The single module may determine a trained ranking model and determine a ranking result of one or more candidate destinations based on the trained ranking model.

Figure 5:
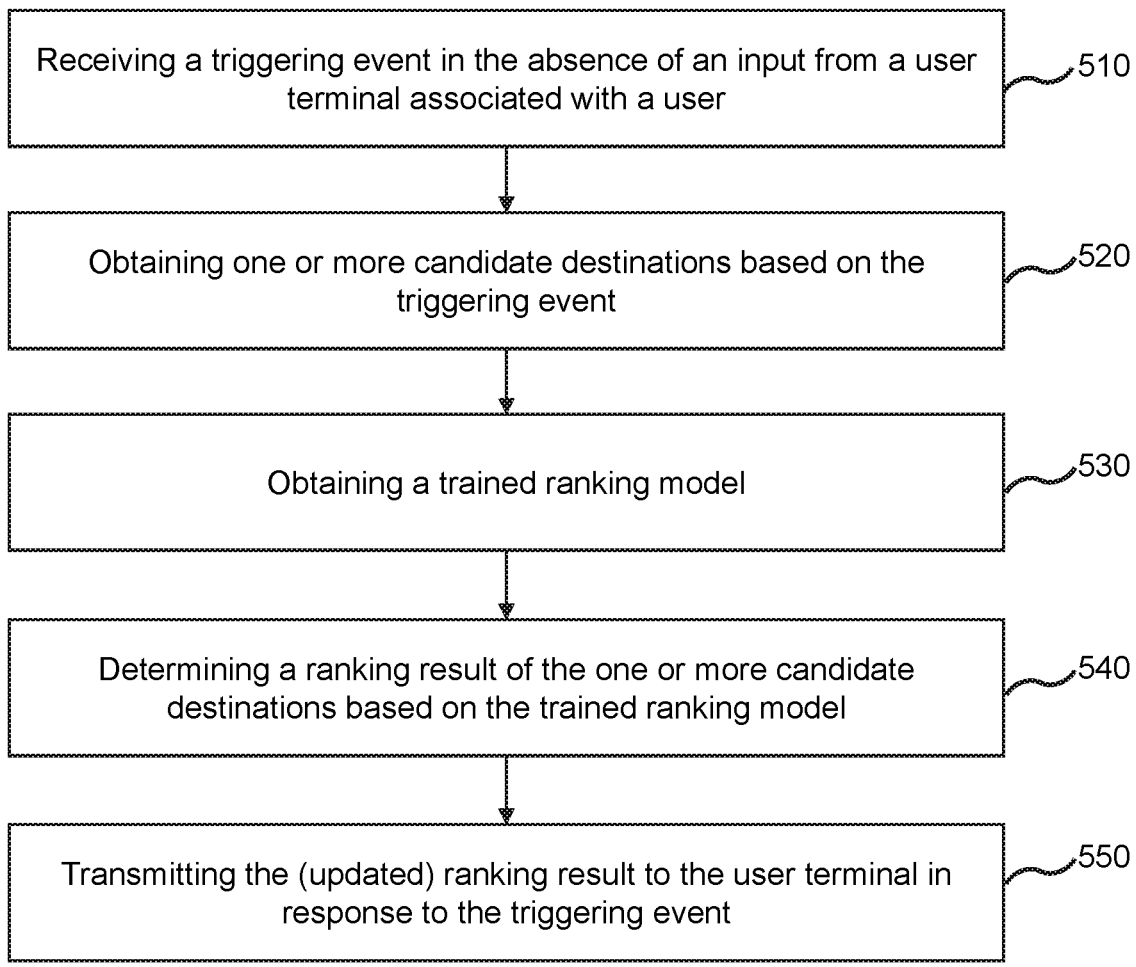
FIG. 5 illustrates an exemplary process for determining a ranking result of one or more candidate destinations using the online to offline service system, according to some embodiments of the present disclosure.

FIG. 5 illustrates an exemplary process for determining a ranking result, according to some embodiments of the present disclosure. The process 500 may be implemented as a set of instructions in a non-transitory storage medium of the server 110 of the online to offline service system 100. The processor 220 of the server 110 may execute the set of instructions and may accordingly perform the steps in the process 500.

The operations of the illustrated process 500 presented below are intended to be illustrative and not limiting. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the acquisition module 410 may receive a triggering event in the absence of input from the user terminal 130 associated with a user. The triggering event may be an event that triggers a request of a ranked destination group. For example, a trigger event may include a user login of a mobile application of the on-demand devices on the user terminal 130, the open or initiation of the mobile application on the user terminal 130, a click by the user on the interface (e.g., an input box, a map) of the mobile application, or other suitable operation on the mobile application.

As illustrated somewhere else, the triggering event may correspond to a current time point and a current location. The current time point refers to a time point when the triggering event occurs. The current location refers to a location where the triggering event occurs (e.g., the current location of the user terminal 130).

In 520, the acquisition module 410 may obtain one or more candidate destinations based on the triggering event. In some embodiments, the acquisition module 410 may select the one or more candidate destinations from a destination collection (e.g., from the storage 150) based on the triggering event. The destination collection may include a plurality of destinations generated beforehand. In some embodiments, the acquisition module 410 may obtain one or more historical records (e.g., one or more historical orders, one or more historical queries) based on the triggering event. The acquisition module 410 may also obtain the one or more candidate destinations based on the one or more historical records. For example, the determination module 430 may obtain the one or more actual destinations of the one or more historical records as the one or more candidate destinations. The acquisition module 410 may obtain the actual destinations of one or more historical orders and/or the latest historical query as the one or more candidate destinations. Each of the one or more candidate destinations may correspond to a historical start time point and a historical start location. The historical start time point corresponding to the candidate destination may include a time point when the historical order is sent or a time point when the historical query is executed. The historical start location may include a location where the historical order is sent or a location where the historical query is executed.

In some embodiments, the acquisition module 410 may obtain the one or more historical records based on the current time point of the triggering event, the current location of the triggering event, or a combination thereof. For example, the acquisition module 410 may obtain one or more historical records within three months from the current time point of the triggering event. Alternatively or additionally, the acquisition module 410 may obtain the one or more historical records whose destination exceeds 1000 meters from the current location of the triggering event. Alternatively, the acquisition module 410 may obtain one or more historical records within three months from the current time point of the triggering event and having a destination exceeding 1000 meters from the current location of the triggering event.

In 530, the training module 420 may obtain a trained ranking model. The trained ranking model may include a machine learning model, for example, a learning-to-rank model. The learning-to-rank model may include a Ranknet model, a LambdaMart model, a Lambdarank model, and the like. In some embodiments, the trained ranking model may be a general ranking model trained using the training data collected from a group of users (e.g., a group of 10000 random users, a group of frequent users). In some embodiments, the ranking model may be a specific ranking model trained using designated training data associated with a user (for example, the user of the user terminal 130). In some embodiments, the ranking model may be trained in accordance with operations of process 600 described in connection with FIG. 6.

In 540, the determination module 430 may determine a ranking result of the obtained one or more candidate destinations in 520 according to the trained ranking model. For each of the one or more candidate destinations, the determination module 430 may extract one or more features, and determine a weighted value corresponding to the candidate destination based on the one or more features and the trained ranking model. The determination module 430 may determine the ranking result of the one or more candidate destinations based on the one or more weighted values.

In some embodiments, the one or more features of a candidate destination may relate to the distance between the current location of the triggering event and the candidate destination.

Alternatively or additionally, the one or more features may relate to the time interval between the current time point of the triggering event and the historical start time point corresponding to the candidate destination. In some embodiments, the time interval between the current time point and the historical start time point may be the time difference between the current time point and the historical start time point in their respective dates. For example, if the current time point is 3:00 p.m. on Jun. 7, 2017 and the historical start time point is 4:00 p.m. on Jul. 7, 2017, the time interval may be an hour. Alternatively, the time interval may be the actual time difference between the current time point and the historical start time point. For example, if the current time point is 3:00 p.m. on Jun. 7, 2017 and the historical start time point is 4:00 p.m. on Jul. 7, 2017, the time interval may be 30 days.

Alternatively or additionally, the one or more features may relate to the occurrence frequency of the candidate destination as the actual destination in historical records. In some embodiments, the occurrence frequency of the candidate destination may be the ratio of the number of historical records whose actual destinations are the candidate destination to the total number of the one or more historical records. For example, if the total number of the historical records is one hundred and the number of the historical records whose actual destinations are the candidate destination is 20, the occurrence frequency of the candidate destination may be 0.20.

In some embodiments, the occurrence(s) of the candidate destination as the actual destination in historical record(s) within a time range from the current time point of the triggering event may be used to determine the occurrence frequency. The time range may be in terms of hours or dates. For example, the time range may be one hour (plus and minus) from the current time point of the triggering event regardless of which date (or regardless which date if the date of a historical record is within certain days, e.g., 30 days). Merely by way of example, if the current time point is 3:00 p.m. on Jun. 7, 2017 and the time range may be 2 to 4 p.m. (i.e., plus and minus one hour from 3:00 p.m.), the occurrence(s) of a candidate destination as the actual destination in historical record(s) whose time point is within the time range of 2 to 4 p.m. will be used (regardless the date of a historical record or regardless the date of the historical record if the date is within, for example, 30 days from the current time point) to determine the occurrence frequency of the candidate destination. Alternatively, the time range may be certain days before the current time point (e.g., 30 days). For example, if the current time point is 3:00 p.m. on Jun. 7, 2017 and the time range may be 30 days, the occurrence(s) of a candidate destination as the actual destination in historical record(s) whose date is within 30 days before the current time point will be used (regardless the time point) to determine the occurrence frequency of the candidate destination. In some embodiments, the occurrence frequency of the candidate destination may be determined on special dates (e.g., holidays, weekend, working days).

In 550, the communication module 440 may transmit the ranking result to the user terminal 130 in response to the triggering event. In some embodiments, the communication module 440 may transmit all or part of the ranking result to the user terminal 130. For example, the communication module 440 may transmit the top six candidate destinations out of ten candidate destinations in the ranking to the user terminal 130. Alternatively, the communication module 440 may transmit ten candidate destinations to the user terminal 130. In some embodiments, the user terminal 130 may display all or part of the candidate destinations to the user via the user interface.

In some embodiments, the process 500 may further include additional steps. The acquisition module 410 may receive a selection by the user of the one or more candidate destinations from the user terminal 130. The acquisition module 410 may also receive a service order based on the selection by the user of the one or more candidate destinations. The above description is merely for illustrative purposes. It should be noted that those skilled in the art may contemplate additional or alternative steps beside the steps described in FIG. 5.

Figure 6:
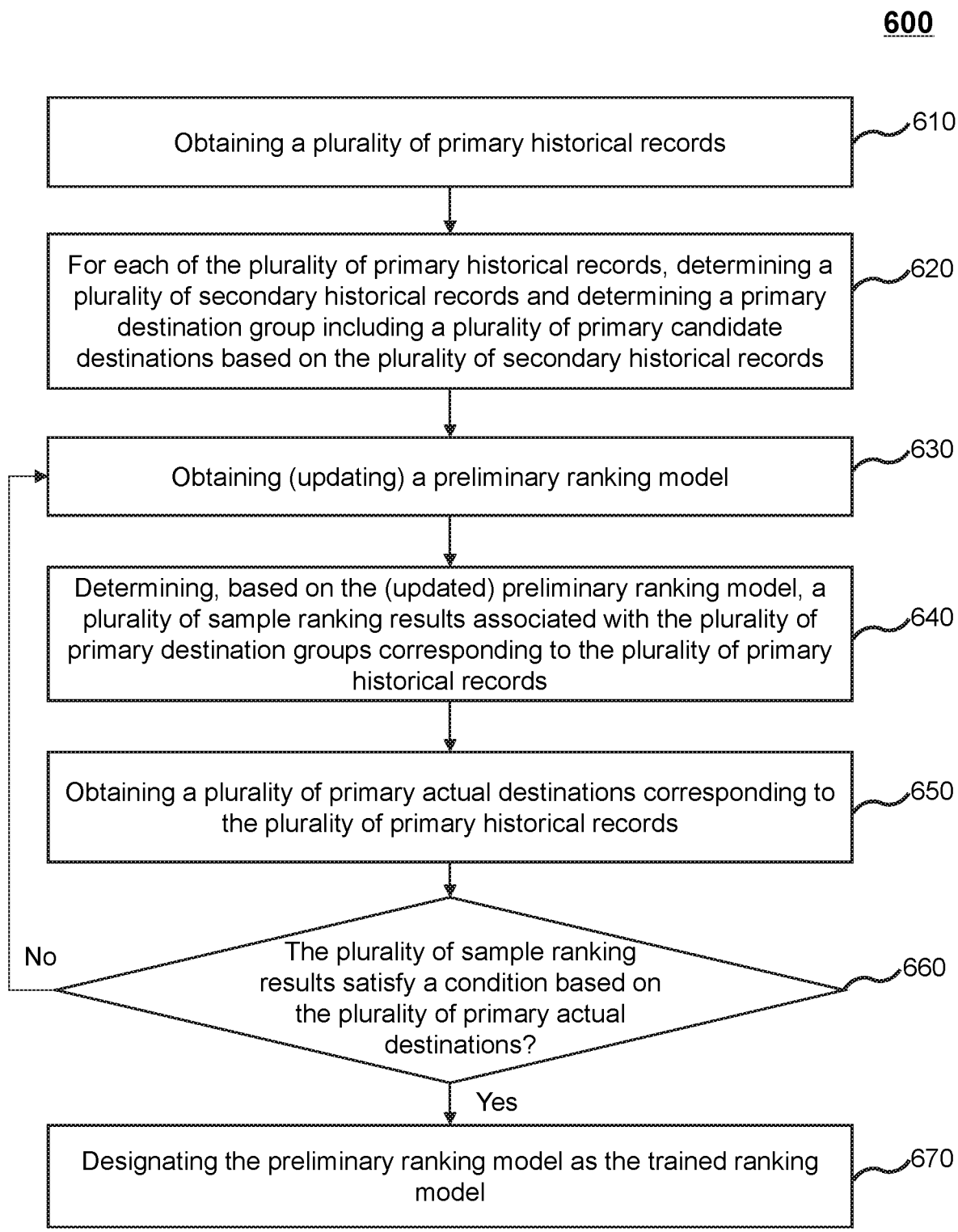
FIG. 6 illustrates an exemplary process for determining a trained ranking model using the online to offline service system, according to some embodiments of the present disclosure.

FIG. 6 illustrates an exemplary process 600 for determining a trained ranking model using the online to offline service system, according to some embodiments of the present disclosure. The process 600 may be implemented as a set of instructions in a non-transitory storage medium of the server 110 of the online to offline service system 100. The processor 220 of the server 110 may execute the set of instructions and may accordingly perform the steps in the process 600.

The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the training module 420 may obtain a plurality of primary historical records. Each of the plurality of primary historical records may include a historical record, which may be a historical order, a historical query, or a combination thereof. As used herein, a historical order refers to a service order initiated by a user and completed by a service provider, and a historical query refers to a service query initiated by a user to request information regarding a service (e.g., fees, estimated waiting time, estimated time of arrival).

In some embodiments, the plurality of primary historical records may associate with a plurality of users of an online to offline service. A primary historical record may include a primary start time point, a primary start location, a primary actual destination, etc. For a primary historical order, the primary start time point refers to a time point when the primary historical order is sent by the user via the user terminal 130 to the server 110 and/or the service provider 140. The primary start location refers to a location where the primary historical order is sent by the user via the user terminal 130 to the server 110 and/or the service provider 140 (e.g., the pickup location of the primary historical order). The primary actual destination refers to the destination of the primary historical order. For a primary historical query, the primary start time point refers to a time point when the primary historical query is executed (e.g., when the user requests information relating to a potential service order). The primary start location refers to a location where the primary historical query is executed. The primary actual destination refers to a destination that a user inputted to execute the primary historical query or a destination that the user selected from a plurality of candidate destinations.

In 620, for each of the plurality of primary historical records, the training module 420 may determine a plurality of secondary historical records. As used in the present application, the secondary historical records of a primary historical record refer to historical records (e.g., historical orders, historical queries) that occurs before the primary historical record. For example, for a primary historical record, the training module 420 may obtain a plurality of secondary historical records that occur within a time range (e.g., 3 months) from the date of the primary historical record.

In some embodiments, each of plurality of secondary historical records may include a secondary start time point, a secondary start location, a secondary actual destination, etc. For a secondary historical order, the secondary start time point refers to a time point when the secondary historical order is sent by the user via the user terminal 130 to the server 110 and/or the service provider 140. The secondary start location refers to a location where the secondary historical order is sent or the service is initiated (e.g., the pickup location) by the user via the user terminal 130 to the server 110 and/or the service provider 140. The secondary actual destination refers to the destination of the historical order. For a secondary historical query, the secondary start time point refers to a time point when the secondary historical query is executed. The secondary start location refers to a location where the secondary historical query is executed. The secondary actual destination refers to a destination that a user inputted to execute the secondary historical query or a destination that the user selected from a plurality of candidate destinations.

In some embodiments, the training module 420 may determine the plurality of secondary historical records based on the primary start time point of the primary historical record, the primary start location of the primary historical record, or a combination thereof. For example, the training module 420 may obtain the secondary historical record(s) within a time range from the primary start time point of the primary historical record (e.g., three months from the primary start time point of the primary historical record). Alternatively or additionally, the training module 420 may obtain the secondary historical record(s) whose destination exceeds a distance (e.g., 1000 meters) from the primary start location of the primary historical record. Alternatively or additionally, the training module 420 may obtain the secondary historical record(s) having a start time point within a time range (e.g., three months) from the primary start time point of the primary historical record and having a destination exceeding a distance (e.g., 1000 meters) from the primary start location of the primary historical record.

Alternatively or additionally, the training module 420 may determine the secondary historical records according to the primary destination group of the primary historical record. In some embodiments, the primary destination group may include a plurality of primary candidate destinations. The plurality of primary candidate destinations may include the destinations that had appeared on the list of the candidate destinations shown in the user interface of the user terminal 130 when the user initiated the primary historical record. The training module 420 may determine one or more secondary historical records that have one of these primary candidate destinations as the primary actual destination.

In some embodiments, for each of the plurality of primary historical records, the training module 420 may determine a plurality of primary candidate destinations according to the determined secondary historical records. For example, the training module 420 may designate the actual destinations of the secondary historical records as the primary candidate destinations, which may be included in the primary destination group of the primary historical record.

An example is given below to help better understanding, which is for illustration purposes only and not intended to be limiting. For a primary historical record generated at 3:00 p.m. on Jul. 7, 2017, the training module 420 may obtain a plurality of secondary historical records that are generated before 3:00 p.m. on Jul. 7, 2017. For example, the training module 420 may obtain the plurality of secondary historical records within 30 days from 3:00 p.m. on Jul. 7, 2017 (i.e., the primary start time). For illustration, the secondary historical records may be referred to as SHR 1, SHR 2, . . . , SHR n. The secondary actual destinations of the secondary historical records may be marked as SAD 1, SAD 2, . . . , SAD m. n and m may be positive integers. In some embodiments, m may be the same as n, and each of the secondary actual destinations of the plurality of secondary historical records may be different. Alternatively, m may be less than n, and at least two of the secondary actual destinations of the secondary historical records may be the same. Then, the training module 420 may determine a group including SAD 1, SAD 2, . . . , and SAD m as the primary destination group.

In 630, the training module 420 may obtain a preliminary ranking model. The preliminary ranking model may include one or more features corresponding to a destination. The preliminary ranking model may also include a preliminary weighting coefficient of each of the one or more features. In some embodiments, the preliminary ranking model may include a learning-to-rank model. The learning-to-rank model may include a Ranknet model, a LambdaMart model, a Lambdarank model, and the like.

In 640, the training module 420 may determine, based on the preliminary ranking model, a plurality of sample ranking results for the plurality of primary destination groups corresponding to the plurality of primary historical records.

A primary historical record may have a primary start time point, a primary start location, a primary actual destination, and a primary destination group including a plurality of primary candidate destinations. A primary candidate destination may be the secondary actual destination of a secondary historical order that has a secondary start time point and a secondary start location. For a primary historical record, the training module 420 may determine, based on the preliminary ranking model, a sample ranking result of the primary candidate destinations of the primary historical record.

In some embodiments, for each of the plurality of primary candidate destinations, the training module 420 may determine one or more features of the primary candidate destination. The one or more features may relate to a distance between the primary candidate destination (i.e., the secondary actual destination) and the primary start location, a time interval between the secondary start time point and the primary start time point, the occurrence frequency of the primary candidate destination in the plurality of secondary historical records in a time period. The occurrence frequency of a primary candidate destination may be the ratio of the number of secondary historical records whose historical actual destinations are the primary candidate destination to the total number of the plurality of secondary historical records in the time range. The time period may be in terms of hours or dates. For example, the time range may be one hour (plus and minus) from the primary start time point of the primary historical record regardless of which date (or regardless which date if the date of a historical record is within certain days, e.g., 30 days). Alternatively, the time range may be certain days before the primary start time point (e.g., 30 days) regardless the time point. In some embodiments, the occurrence frequency of the primary candidate destination may be determined on special dates (e.g., holidays, weekend, working days).

Merely by way of example, if the primary start time point of a primary historical record is 3:00 p.m. on Jul. 7, 2017, the primary start location is the east gate of Peking University, the primary actual destination is the east gate of Renmin University of China, and the primary destination group includes three primary candidate destinations, namely, D1, D2, and D3. D1 is the actual destination of a secondary historical record that has the secondary start time point of 1 p.m. on Jul. 7, 2017 and the secondary start location as the west gate of Tsinghua University. For D1, the distance between the primary candidate destination and the primary start location is the distance between D1 and the east gate of Peking University. The time interval between the secondary start time point and the primary start time point may be the time difference between 3:00 p.m. on Jul. 7, 2017 and 1 p.m. on Jul. 7, 2017 (i.e., two hours). The occurrence frequency of D1 may be the ratio of the number of secondary historical records whose historical actual destinations are D1 to the total number of the plurality of secondary historical records in a time range (e.g., within 30 days before the primary start time point).

For each of the plurality of primary candidate destinations, the training module 420 may assign one or more preliminary weighting coefficients of the preliminary ranking model to the one or more features of the primary candidate destination. The training module 420 may also determine a preliminary weighted value corresponding to the primary candidate destination based on the one or more features and the one or more preliminary weighting coefficients.

For each of the primary historical records, the training module 420 may determine a ranking result of the primary candidate destinations of the primary destination group based on the plurality of preliminary weighted values.

In 650, the training module 420 may obtain a plurality of primary actual destinations corresponding to the plurality of primary historical records. A primary historical records may include a primary actual destination. The training module 420 may extract the plurality of primary actual destinations based on the plurality of primary historical records.

In 660, the training module 420 may determine whether the plurality of sample ranking results satisfy a condition based on the plurality of actual destinations. In some embodiments, the training module 420 may determine a loss function of the preliminary model based on the plurality of sample ranking results. The training module 420 may also determine whether the loss function of the preliminary model is less than a predetermined threshold.

In some embodiments, the loss function may be determined based on Normalized Discounted Cumulative Gain (NDCG). The NDCG may indicate a measure of the quality of a sample ranking result. When the NDCG is greater, the loss function may be smaller. Specifically, for each of the plurality of primary destination groups, the training module 420 may determine an NDCG. The NDCG may be determined based on the ranking of the primary actual destination in the primary destination group. For example, if the primary actual destination is No. 1 in a sample ranking result of the primary candidate destinations of a primary historical record, the NDCG is greater.

For the plurality of primary historical records, the training module 420 may determine an average NDCG of the plurality of primary destination groups corresponding to the plurality of primary historical records. The obtaining module 410 may determine the loss function based on the average NDCG of the plurality of primary destination groups.

Upon a determination that the plurality of sample ranking results fail to satisfy a condition based on the plurality of primary actual destinations, for example, the loss function is not less than the predetermined threshold, the process 600 may proceed to 630 and may update the preliminary ranking model. In some embodiments, the training module 420 may update the preliminary ranking model by adjusting the preliminary weighting coefficients. The training module 420 may also perform steps 640 through 660. In other words, the training module 420 may adjust the one or more preliminary weighting coefficients of the preliminary model until the plurality of sample ranking results satisfy the condition.

Upon a determination that the plurality of sample ranking results satisfy the condition based on the plurality of actual destinations, for example, the loss function is less than the predetermined threshold, the process 600 may proceed to 670. In 670, the training module 420 may designate the (updated) preliminary ranking model as the trained ranking model. The trained ranking model may include one or more final weighting coefficients which may output a ranking result of candidate destinations.

The above description is merely for illustrative purposes. It should be noted that those skilled in the art may contemplate additional or alternate steps beside the steps described in FIG. 6. For example, the process 600 may further include transmitting the ranking model to the storage 150 or any other components in the online to offline service system 100 by the communication module 440.

Figure 7:
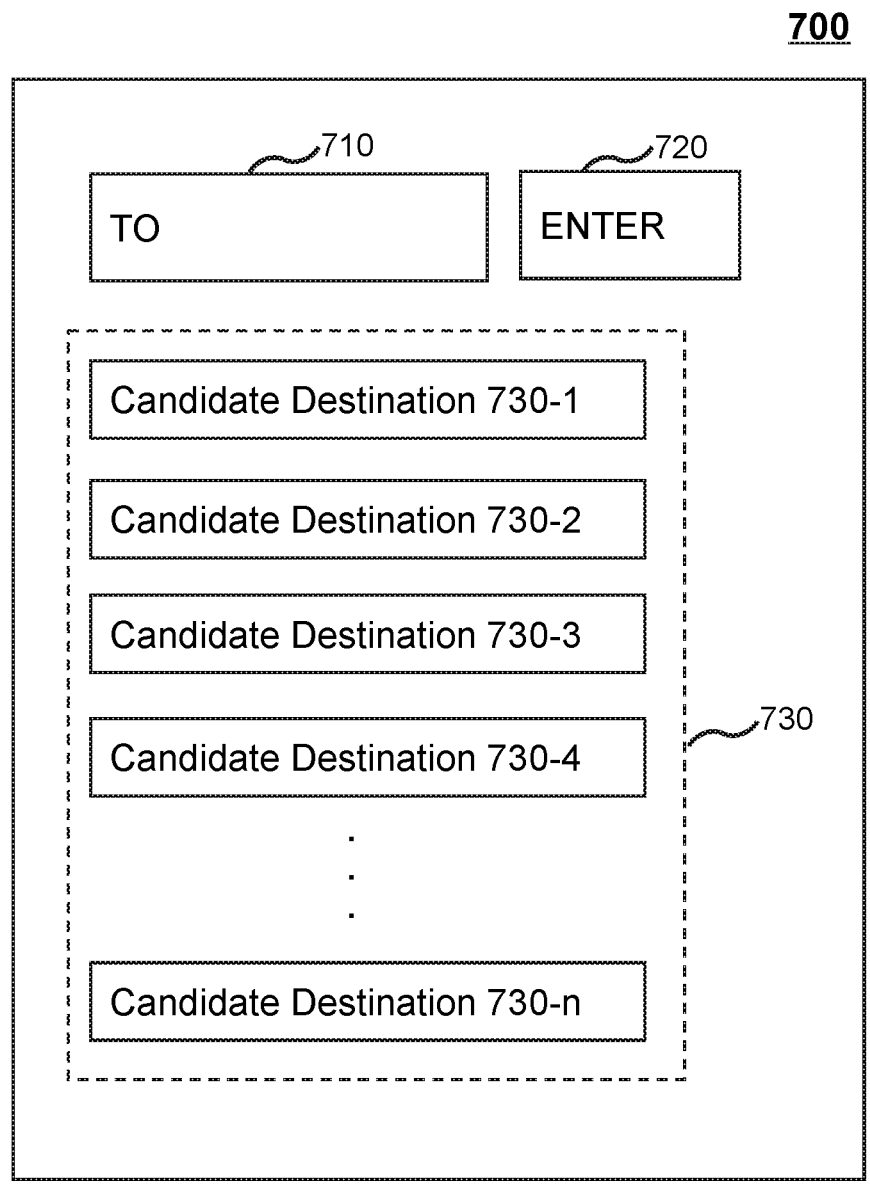
FIG. 7 illustrates an exemplary interface of a mobile application on a user terminal, according to some embodiments of the present disclosure.

FIG. 7 illustrates an exemplary interface 700 of a mobile application on the user terminal 130, according to some embodiments of the present disclosure. As illustrated in FIG. 7, the interface 700 may include an input box 710, an enter button 720, and a destination group 730. The destination group 730 may include a candidate destination 730-1, a candidate destination 730-2, . . . , a candidate destination 730-n. The candidate destination 730-1, the candidate destination 730-2, . . . , the candidate destination 730-n may be ranked, one of which may be the actual destination (e.g., the candidate destination 730-2) that is selected by the user via the user interface.

When the user of the mobile application (for example, a mobile application of an online to offline service) triggers an triggering event, for example, clicking the input box 710, the user terminal 130 may obtain the triggering event and present all or part of the destination group (e.g., the candidate destinations in the ranking) to the user.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lies in less than all features of a single foregoing disclosed embodiment.

We claim:

1. A system, comprising:
at least one storage device including a set of instructions; and
at least one processor in communication with the at least one storage device, wherein when executing the set of instructions, the at least one processor is configured to cause the system to:
receive a triggering event in the absence of input from a user terminal associated with a user;
obtain one or more candidate destinations based on the triggering event;
obtain a trained ranking model by executing a training process comprising:
obtaining a plurality of primary historical records, the primary historical record including a primary historical order or a primary historical query;
for each of the plurality of primary historical records, determining a plurality of secondary historical records, the secondary historical record including a secondary historical order or a secondary historical query; and
determining a primary destination group corresponding to the each of the primary historical records, the primary destination group including a plurality of primary candidate destinations based on the plurality of secondary historical records;
obtaining a preliminary ranking model;
determining, based on the preliminary ranking model, a plurality of sample ranking results for the primary destination groups corresponding to the plurality of primary historical records;
obtaining a plurality of primary actual destinations corresponding to the plurality of primary historical records;
determining whether the plurality of sample ranking results satisfy a condition based on the plurality of primary actual destinations; and
designating, based on a result of the determination that the plurality of ranking results satisfy the condition, the preliminary ranking model as the trained ranking model;
determine a ranking result of the one or more candidate destinations based on the trained ranking model; and
transmit the ranking result to the user terminal in response to the triggering event.

2. The system of claim 1, wherein to obtain the one or more candidate destinations, the at least one processor is configured to cause the system to:
obtain a current location of the user terminal;
obtain one or more historical records associated with the user, the one or more historical records including at least a historical order or a historical query; and
obtain the one or more candidate destinations based on the one or more historical records and the current location of the user terminal.

3. The system of claim 1, wherein determining the plurality of sample ranking results comprises:
for each of the plurality of primary historical records,
for each of the plurality of primary candidate destinations of the primary destination group corresponding to the each of the plurality of primary historical records,
extracting one or more features associated with the each of the plurality of primary candidate destinations;
assigning one or more preliminary weighting coefficients to the extracted one or more features; and
determining, based on the one or more features and the one or more preliminary weighting coefficients, a preliminary weighted value corresponding to the each of the plurality of the primary candidate destinations; and
determining, based on the determined preliminary weighted values corresponding to the plurality of primary candidate destinations, a sample ranking result for the each of the primary historical records.

4. The system of claim 3, wherein the training process further comprises:
updating, based on a result of the determination that the plurality of sample ranking results fail to satisfy the condition, the one or more preliminary weighting coefficients of the preliminary ranking model.

5. The system of claim 3, wherein
each of the plurality of primary historical records corresponds to a primary start time point or a primary start location, the primary start time point including a time point when the primary historical order is sent or a time point when the primary historical query is executed, the primary start location including a location where the primary historical order is sent or a location where the primary historical query is executed;

each of the plurality of secondary historical records corresponds to a secondary start time point, the secondary start time point including a time point when the secondary historical order is sent or a time point when the secondary historical query is executed; and the one or more features associated with the each of the plurality of primary candidate destinations of the each of the plurality of the primary historical records include at least one of:

a distance between the primary start location of the each of the plurality of the primary historical records and the primary candidate destination of the each of the plurality of the primary historical records;

a time interval between the primary start time point of the each of the plurality of the primary historical records and the secondary start time point corresponding to the primary candidate destination of the each of the plurality of the primary historical records; or an occurrence frequency of the primary candidate destination of the each of the plurality of the primary historical records in the plurality of secondary historical records in a time period.

6. The system of claim 1, wherein the preliminary ranking model includes a Lambdarank model.

7. A method implemented on a computing device having at least one processor, at least one computer-readable storage medium including a set of instructions, and a communication platform connected to a network, the method steps implemented by the at least one processor executing the set of instructions, the steps comprising:

receiving a triggering event in the absence of input from a user terminal associated with a user;

obtaining one or more candidate destinations based on the triggering event;

obtaining a trained ranking model by executing a training process comprising:

obtaining a plurality of primary historical records, the primary historical record including a primary historical order or a primary historical query;

for each of the plurality of primary historical records,
determining a plurality of secondary historical records, the secondary historical record including a secondary historical order or a secondary historical query; and
determining a primary destination group corresponding to the each of the primary historical records, the primary destination group including a plurality of primary candidate destinations based on the plurality of secondary historical records;

obtaining a preliminary ranking model;
determining, based on the preliminary ranking model, a plurality of sample ranking results for the primary destination groups corresponding to the plurality of primary historical records;
obtaining a plurality of primary actual destinations corresponding to the plurality of primary historical records;
determining whether the plurality of sample ranking results satisfy a condition based on the plurality of primary actual destinations; and designating, based on a result of the determination that the plurality of ranking results satisfy the condition, the preliminary ranking model as the trained ranking model;

determining a ranking result of the one or more candidate destinations based on the trained ranking model; and transmitting the ranking result to the user terminal in response to the triggering event.

8. The method of claim 7, wherein obtaining the one or more candidate destinations comprises:

obtaining a current location of the user terminal;
obtaining one or more historical records associated with the user, the one or more historical records including at least a historical order or a historical query; and
obtaining the one or more candidate destinations based on the one or more historical records and the current location of the user terminal.

9. The method of claim 7, wherein determining the plurality of sample ranking results comprises:

for each of the plurality of primary historical records,
for each of the plurality of primary candidate destinations of the primary destination group corresponding to the each of the plurality of primary historical records,
extracting one or more features associated with the each of the plurality of primary candidate destinations;
assigning one or more preliminary weighting coefficients to the extracted one or more features; and
determining, based on the one or more features and the one or more preliminary weighting coefficients, a preliminary weighted value corresponding to the each of the plurality of the primary candidate destinations; and
determining, based on the determined preliminary weighted values corresponding to the plurality of primary candidate destinations, a sample ranking result for the each of the primary historical records.

10. The method of claim 9, wherein the training process further comprises:

updating, based on a result of the determination that the plurality of sample ranking results fail to satisfy the condition, the one or more preliminary weighting coefficients of the preliminary ranking model.

11. The method of claim 9, wherein each of the plurality of primary historical records corresponds to a primary start time point or a primary start location, the primary start time point including a time point when the primary historical order is sent or a time point when the primary historical query is executed, the primary start location including a location where the primary historical order is sent or a location where the primary historical query is executed;

each of the plurality of secondary historical records corresponds to a secondary start time point, the secondary start time point including a time point when the secondary historical order is sent or a time point when the secondary historical query is executed; and the one or more features associated with the each of the plurality of primary candidate destinations of the each of the plurality of the primary historical records include at least one of:

a distance between the primary start location of the each of the plurality of the primary historical records and the primary candidate destination of the each of the plurality of the primary historical records;

a time interval between the primary start time point of the each of the plurality of the primary historical records and the secondary start time point corresponding to the primary candidate destination of the each of the plurality of the primary historical records; or an occurrence frequency of the primary candidate destination of the each of the plurality of the primary historical records in the plurality of secondary historical records in a time period.

12. The method of claim 7, wherein the preliminary ranking model includes a Lambdarank model.

13. A non-transitory computer readable medium embodying a computer program product, the computer program product comprising instructions configured to cause a computing system to:

receive a triggering event in the absence of input from a user terminal associated with a user;

obtain one or more candidate destinations based on the triggering event;

obtain a trained ranking model by executing a training process comprising:
  obtaining a plurality of primary historical records, the primary historical record including a primary historical order or a primary historical query;
  for each of the plurality of primary historical records,
    determining a plurality of secondary historical records, the secondary historical record including a secondary historical order or a secondary historical query; and
    determining a primary destination group corresponding to the each of the primary historical records, the primary destination group including a plurality of primary candidate destinations based on the plurality of secondary historical records;
  obtaining a preliminary ranking model;
  determining, based on the preliminary ranking model, a plurality of sample ranking results for the primary destination groups corresponding to the plurality of primary historical records;
  obtaining a plurality of primary actual destinations corresponding to the plurality of primary historical records;
  determining whether the plurality of sample ranking results satisfy a condition based on the plurality of primary actual destinations; and
  designating, based on a result of the determination that the plurality of ranking results satisfy the condition, the preliminary ranking model as the trained ranking model;

determine a ranking result of the one or more candidate destinations based on the trained ranking model; and transmit the ranking result to the user terminal in response to the triggering event.

14. The non-transitory computer readable medium of claim 13, wherein to obtain the one or more candidate destinations, the computer program product further comprises instructions configured to cause the computing system to:

obtain a current location of the user terminal;

obtain one or more historical records associated with the user, the one or more historical records including at least a historical order or a historical query; and obtain the one or more candidate destinations based on the one or more historical records and the current location of the user terminal.

15. The non-transitory computer readable medium of claim 13, wherein determining the plurality of sample ranking results comprises:

for each of the plurality of primary historical records,
  for each of the plurality of primary candidate destinations of the primary destination group corresponding to the each of the plurality of primary historical records,
    extracting one or more features associated with the each of the plurality of primary candidate destinations;
    assigning one or more preliminary weighting coefficients to the extracted one or more features; and
    determining, based on the one or more features and the one or more preliminary weighting coefficients, a preliminary weighted value corresponding to the each of the plurality of the primary candidate destinations; and
  determining, based on the determined preliminary weighted values corresponding to the plurality of primary candidate destinations, a sample ranking result for the each of the primary historical records.

16. The non-transitory computer readable medium of claim 15, wherein the training process further comprises:

updating, based on a result of the determination that the plurality of sample ranking results fail to satisfy the condition, the one or more preliminary weighting coefficients of the preliminary ranking model.

17. The non-transitory computer readable medium of claim 15, wherein each of the plurality of primary historical records corresponds to a primary start time point or a primary start location, the primary start time point including a time point when the primary historical order is sent or a time point when the primary historical query is executed, the primary start location including a location where the primary historical order is sent or a location where the primary historical query is executed;

each of the plurality of secondary historical records corresponds to a secondary start time point, the secondary start time point including a time point when the secondary historical order is sent or a time point when the secondary historical query is executed; and the one or more features associated with the each of the plurality of primary candidate destinations of the each of the plurality of the primary historical records include at least one of:

a distance between the primary start location of the each of the plurality of the primary historical records and the primary candidate destination of the each of the plurality of the primary historical records;

a time interval between the primary start time point of the each of the plurality of the primary historical records and the secondary start time point corresponding to the primary candidate destination of the each of the plurality of the primary historical records; or an occurrence frequency of the primary candidate destination of the each of the plurality of the primary historical records in the plurality of secondary historical records in a time period.

18. The non-transitory computer readable medium of claim 13, wherein the preliminary ranking model includes a Lambdarank model.

* * * * *